United States Patent
Perten et al.

(10) Patent No.: US 8,966,972 B2
(45) Date of Patent: Mar. 3, 2015

(54) FLEXIBLE FUEL SENSOR

(75) Inventors: Herbert Perten, Suffern, NY (US); Timothy P. Sifkin, Morristown, NJ (US)

(73) Assignee: Startrak Information Technologies, LLC, Fort Lee, NJ (US)

( * ) Notice: Subject to any disclaimer, the term of this patent is extended or adjusted under 35 U.S.C. 154(b) by 117 days.

(21) Appl. No.: 13/240,178

(22) Filed: Sep. 22, 2011

(65) Prior Publication Data

US 2012/0067757 A1    Mar. 22, 2012

Related U.S. Application Data

(60) Provisional application No. 61/385,546, filed on Sep. 22, 2010.

(51) Int. Cl.
*G01F 23/00* (2006.01)
*G01F 23/26* (2006.01)

(52) U.S. Cl.
CPC ............ *G01F 23/266* (2013.01); *G01F 23/268* (2013.01)
USPC ...................................................... 73/290 R

(58) Field of Classification Search
CPC .................... A61M 25/0074; A61B 17/22031; G01F 23/00; G01F 23/263; G01F 23/268; G01F 23/266; G01F 23/26; G01N 2203/0023; G01N 3/32; G01N 2203/0005; G01N 2203/0256; G01D 5/00
USPC .............. 73/35, 65, 812, 820, 862, 142, 170, 73/305, 290 R, 304 R, 318, 321, 304 C
See application file for complete search history.

(56) References Cited

U.S. PATENT DOCUMENTS

| | | | | |
|---|---|---|---|---|
| 2,657,573 | A * | 11/1953 | Castricum | 73/794 |
| 4,381,663 | A * | 5/1983 | Swanson | 73/37 |
| 4,418,571 | A * | 12/1983 | Asmundsson et al. | 73/304 C |
| 4,470,505 | A * | 9/1984 | Korwin et al. | 206/219 |
| 4,852,054 | A * | 7/1989 | Mastandrea | 702/51 |
| 4,854,783 | A * | 8/1989 | Uchida et al. | 406/13 |
| 4,904,878 | A * | 2/1990 | Gipp et al. | 250/577 |
| 4,922,748 | A * | 5/1990 | Hopenfeld | 73/86 |
| 4,942,763 | A * | 7/1990 | Harpster | 73/202.5 |
| 5,595,088 | A * | 1/1997 | Horner | 73/290 V |
| 5,602,540 | A * | 2/1997 | Spillman, Jr. | 340/870.37 |
| 5,828,798 | A * | 10/1998 | Hopenfeld | 385/12 |
| 6,195,013 | B1 * | 2/2001 | Robinson | 340/623 |
| 6,629,447 | B1 * | 10/2003 | Collins | 73/1.16 |
| 7,392,699 | B2 * | 7/2008 | Motzer et al. | 73/290 R |
| 2002/0144957 | A1 * | 10/2002 | Held et al. | 210/748 |
| 2004/0123671 | A1 * | 7/2004 | Priev et al. | 73/861.19 |
| 2008/0290011 | A1 * | 11/2008 | Capano et al. | 210/104 |
| 2011/0197988 | A1 * | 8/2011 | Van Vliet et al. | 141/1 |
| 2012/0055265 | A1 * | 3/2012 | Melamed | 73/861.42 |
| 2012/0259265 | A1 * | 10/2012 | Salehi et al. | 604/9 |

* cited by examiner

*Primary Examiner* — Peter Macchiarolo
*Assistant Examiner* — Mohammed Keramet-Amircola
(74) *Attorney, Agent, or Firm* — Drinker Biddle & Reath LLP

(57) ABSTRACT

A flexible fuel sensor for measuring the fuel level in a tank in which the sensor is installed. The flexible fuel sensor comprises a fitting arranged to be mounted to a mated fitting on a fuel tank associated with a hole in the fuel tank, a flexible down member extending from the fitting in a first direction and including a fuel level sensing mechanism, the down member configured to be mounted to extend through the hole into the fuel tank, and a sensor head extending from the fitting in a second direction and including sensor electronics coupled to the fuel level sensing mechanism. The flexible down member may comprise a coil made of steel wire.

15 Claims, 7 Drawing Sheets

FIG. 13A     FIG. 13B

FLEXIBLE FUEL SENSOR

This application is related to and claims priority from U.S. provisional patent application Ser. No. 61/385,546 filed Sep. 22, 2010, the entirety of which is incorporated herein by reference as if fully set forth.

BACKGROUND

Most long-distance refrigerated transport by truck is done via tractor-trailer trucks in which the tractor pulls a refrigerated semi-trailer, or "reefer". Reefers are generally equipped with a mechanical refrigeration system powered by small displacement diesel engine. Commonly, the fuel for the engine is carried in a fuel tank attached to the bottom of the trailer, for example, using a bracket arrangement that holds the tank in a fixed position in close proximity to the trailer. A fuel level sensor is generally installed on the tank to monitor the level of fuel in the tank during normal reefer operation. A portion of the fuel sensor called a down tube is disposed within the tank and maintains contact with the fuel to detect the level of fuel in the tank. In the prior art, the down tube is rigid and extends from the top of the tank to near the bottom of the tank, and is thereby able to detect the level of fuel in the tank at essentially any level. To install the fuel sensor on the tank, the down tube is inserted into the fuel tank through a hole in the top of the tank. The down tube connects to a portion of the sensor comprising electronics that remains outside of the tank. The tank with the sensor installed is then attached to the trailer, oriented so that the hole and sensor electronics are located at the top of the attached tank.

In general, the distance between the bottom of the trailer and the top of the attached tank is much smaller than the depth of the tank. Hence, the length of the installed down tube is much greater than the clearance between the tank and the trailer. Accordingly, the sensor cannot be installed on the tank when the tank is attached to the trailer, because the clearance is not sufficient for the down tube to be inserted into the tank. Moreover, in order to replace a fuel sensor, the tank must be removed from the trailer. Most commonly the tank is emptied, detached from the trailer and rotated to provide the clearance required to remove the fuel sensor and install a replacement. After the new sensor is installed, the tank must be rotated back to its upright position, reattached to the trailer, and refilled with fuel. This is a time consuming and inconvenient operation, particularly if the tank contains a large amount of fuel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, example of which is illustrated in the accompanying drawings.

The herein described apparatus pertains to the problem of installing a fuel sensor with a down tube on a fuel tank with clearance between the top of the tank and the bottom of the trailer to which it is attached that is less than the length of the down tube. Because prior art sensors comprise rigid down tubes, the clearance between the tank and the bottom of the trailer is generally not sufficient to install the sensors, so the tank must be removed from the trailer to install or replace a fuel sensor. A fuel sensor is disclosed comprising a down tube that is sufficiently flexible to bend under an applied force while being inserted into the fuel tank through a hole in the top of the tank, yet sufficiently rigid to return to its default straight configuration when the force is removed, thereafter extending from the top of the tank to the bottom of the tank to enable measurement of the fuel level in the tank. The clearance that is generally available between a trailer and an already attached tank is sufficient to allow for the installation of the flexible fuel sensor, even if the tank contains fuel.

Figure 1:
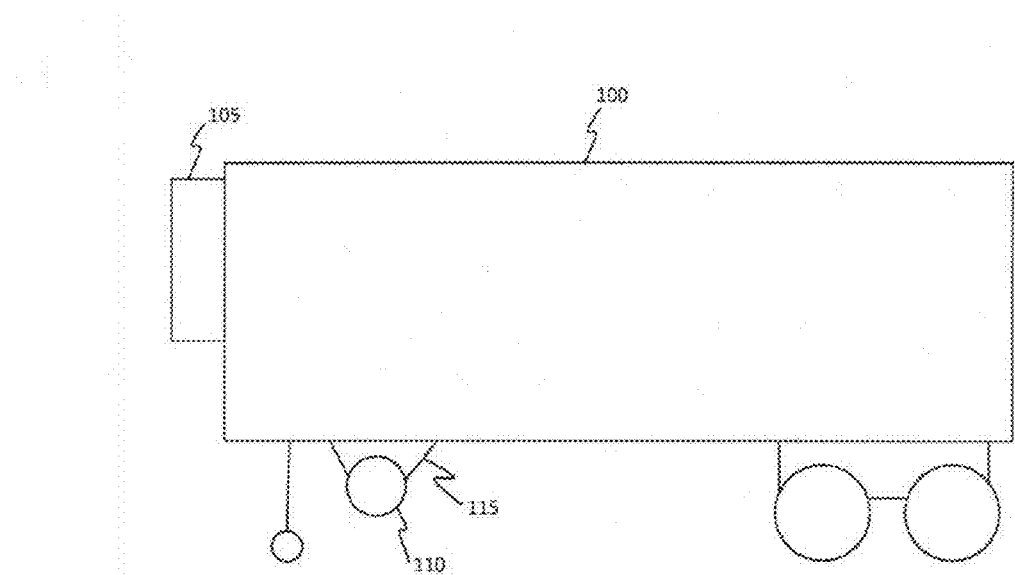
FIG. 1 is a simplified representation of a reefer unit.

FIG. 1 is a simplified representation of a refrigerated semi trailer, or "reefer." It includes a trailer (100) equipped with a refrigeration unit (105). The refrigeration unit comprises a diesel engine (not shown) supplied with fuel from a fuel tank (110). The tank is typically mounted to the bottom of the trailer with some sort of bracket, yoke, or strap (115). Fuel tanks used in the United States are typically circular cylinders 22" diameter, and are mounted approximately six inches below the bottom of the trailer. The figures show a cylindrical tank with its axis oriented horizontally, as would normally be the case when the tank is attached to a trailer, although tanks having other shapes or orientations may be used.

Figure 2:
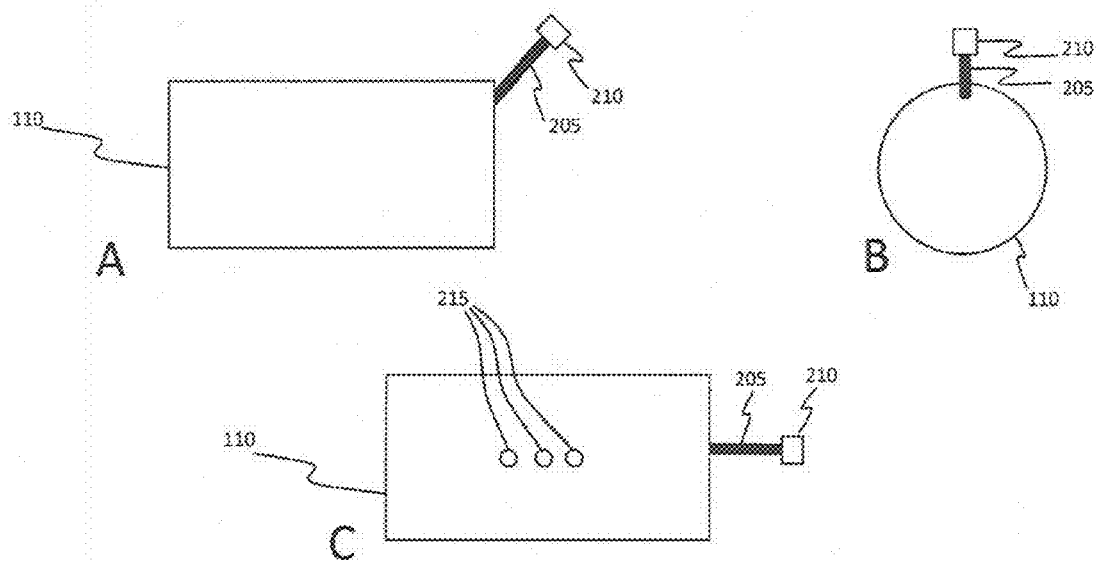
FIG. 2 presents diagrammatic views of a fuel tank.

FIG. 2 gives more detailed views of tank (110), including a side view (A), end view (B), and top view (C). The tank includes a fill tube (205) equipped with a cap (210). Threaded holes (215) are provided at the top of the tank. Although three holes are shown, more or fewer holes may be included. The fuel sensor is installed through one of the holes. Generally, two other holes are used to attach engine fuel supply and return tubes. Another hole (not shown) may be used for a tank vent. An alternative fuel sensor mounting arrangement (not shown) may use a mounting flange welded to the top of the tank.

Figure 3:
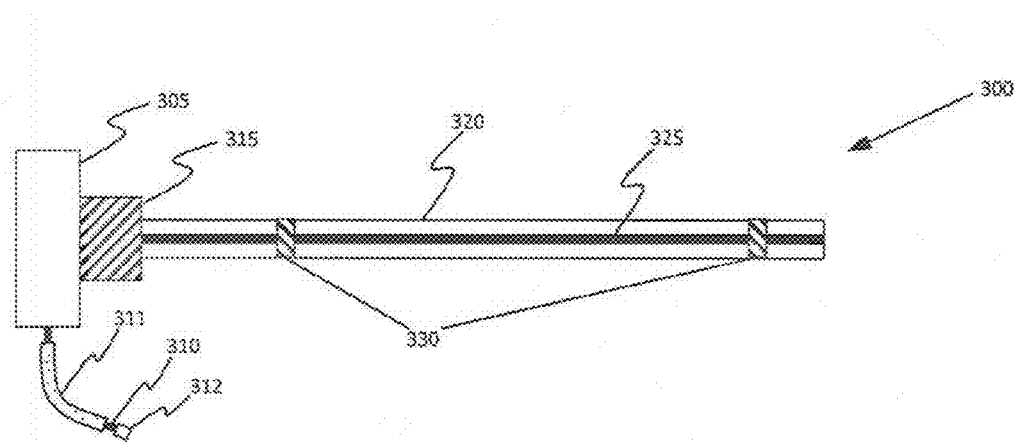
FIG. 3 is a diagram of an embodiment of a flexible fuel sensor in accordance with the herein disclosed apparatus.
Figure 4:
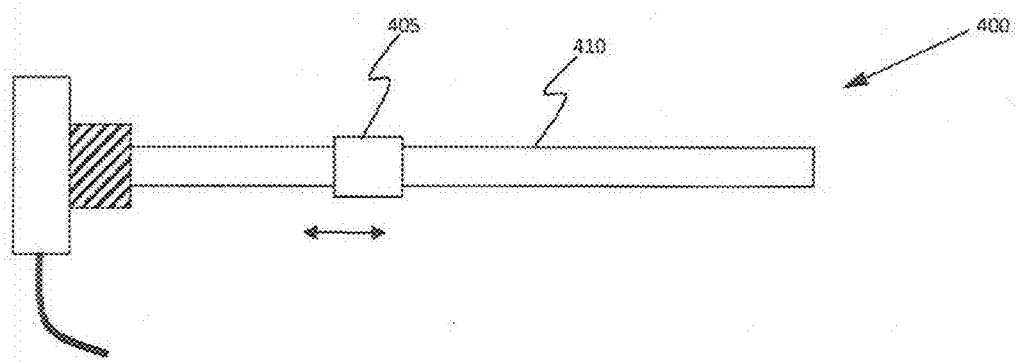
FIG. 4 is a diagram of another embodiment of a flexible fuel sensor.

FIGS. 3 and 4 show two embodiments of a flexible fuel sensor, (300) and (400) respectively, using different types of sensors. Other types of sensors may be also be used. In general, a fuel sensor comprises a sensor head (305) containing sensor electronics and interfaces, and may also comprise terminations for sensor wiring, such as for powering the sensor and to send sensor signals to a sensor gauge. The sensor electronics include a signal sending unit for sending to a fuel gauge a signal that conveys to the fuel gauge the level of fuel in a fuel tank. The sensor wiring (310) may be protected by a cover (311) surrounding the sensor wiring, and a coupling (312) for coupling the sensor wiring to fuel gauge wiring, which conveys the signal from the signal sending unit to the fuel gauge. A threaded fitting (315) allows the fuel sensor to be screwed into mated threads in a hole or fitting (215) on top of the fuel tank (110). An electrical signal corresponding to the sensed fuel level is transmitted via cable (310) to a readout, such as a fuel gauge on an instrument panel mounted in a dashboard. Cable (310) may also include conductors for powering the sensor electronics. Typically, the cable comprises sensor wiring attached to a coupling, and fuel gauge wiring attached to a mated coupling. The couplings can be connected together to facilitate easy installation of the fuel sensor or the fuel gauge, and disconnected to facilitate easy removal of the fuel sensor or the fuel gauge.

In alternative embodiments, instead of wire terminations the sensor may be self-powered and wireless, and comprise elements that provide for power and communications such as a battery and wireless transmitter (not shown). For illustrative purposes, an exemplary wired embodiment is shown in the drawings, but wireless embodiments may also be used.

FIG. 3 illustrates an exemplary flexible fuel sensor (300) with a down member comprising an outer tube (320) and an inner tube (325). The flexible fuel sensor (300) senses fuel level by measuring the capacitance between the outer tube (320) and the inner tube (325). Since the dielectric constant of fuel differs significantly from that of air, the level of fuel may be inferred by the measured value of the capacitance between the tubes. The outer and inner tubes are kept concentric by means of spacers (330). In the prior art, the tubes are constructed out of rigid tubing, such as aluminum tubing. In this exemplary embodiment, the fuel level sensing mechanism includes a flexible down tube comprising an electrically conductive inner flexible tube (325), an electrically conductive outer flexible tube (320), and one or more electrically insulating spacers (330) disposed between the inner and outer tubes and arranged to maintain uniform concentric separation between the tubes. The fuel sensor also comprises a capacitance measuring device coupled to the inner and the outer tubes, arranged to measure the value of the capacitance between the tubes. The fuel level may be inferred based on the measured value of the capacitance. In a currently preferred embodiment, each of the inner and outer tubes comprise a wire coil. In particular, the outer coil may have a body length of between about 20.5 and about 22 inches for use in a cylindrical fuel tank 22 inches in diameter, and an outside diameter substantially equal to 0.5 inch. The outer coil wire may comprise stainless steel or carbon steel wire having a circular cross section with a wire diameter between about 0.065 and 0.085 inches. Other types of tubes and coils may be also used, provided they provide sufficient capacitance to be accurately measured in this type of embodiment, are sufficiently flexible to be bent when inserted into the fuel tank, and sufficiently stiff to return to a free straight state when installed. In other exemplary embodiments, the down member may comprise a plurality of alternating rigid and flexible portions.

Figure 13C:
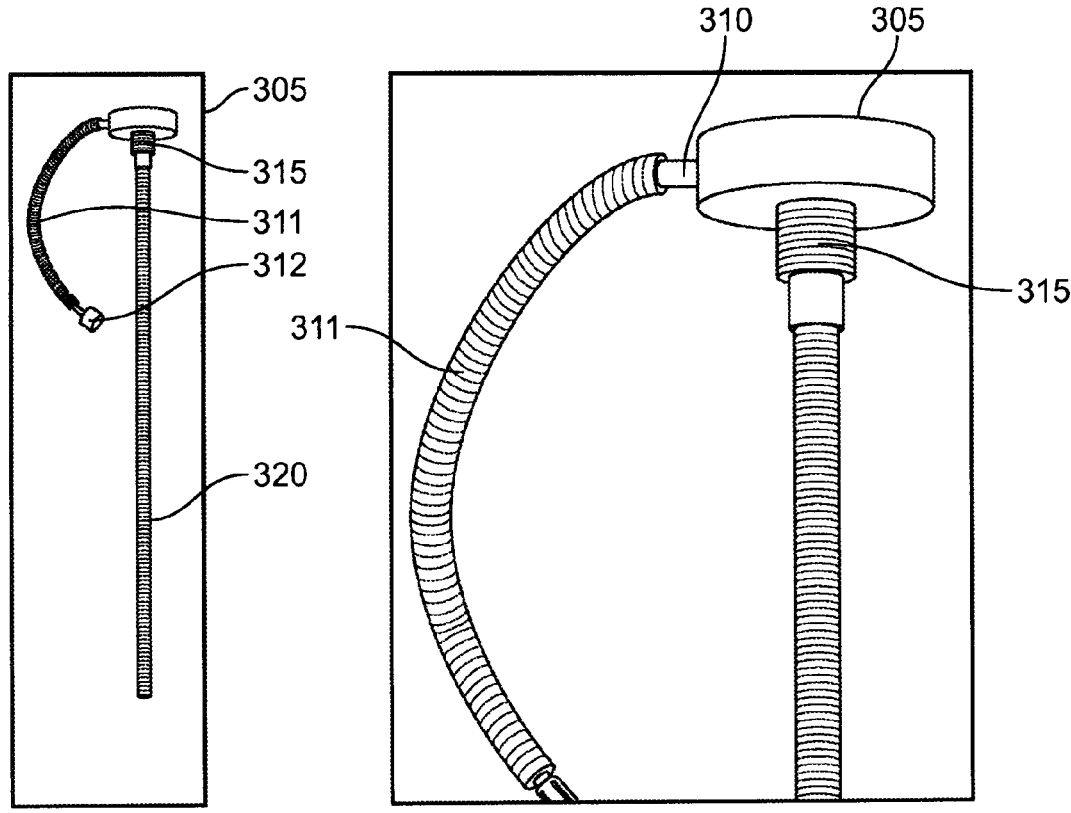
FIG. 13 presents photographic views of an embodiment of a flexible fuel sensor in accordance with the herein disclosed apparatus.
Figure 13C:
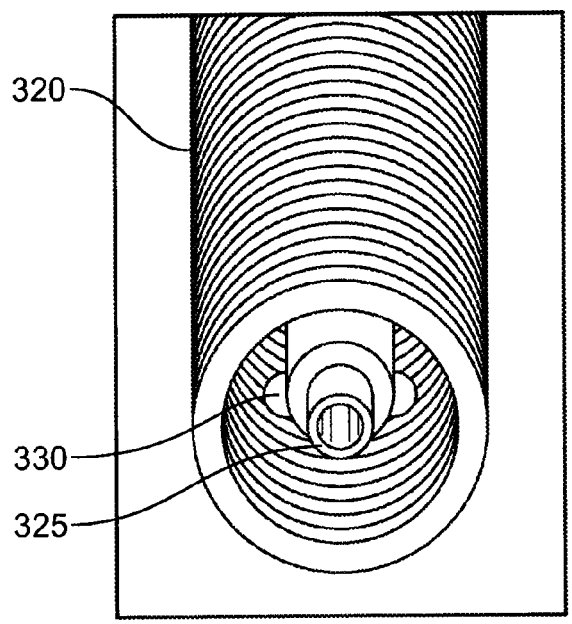

FIG. 13 shows three views of such an embodiment, showing the entire flexible fuel sensor (A), the sensor head and elements attached thereto (B), and the free end of the down tube (C).

FIG. 4 illustrates an exemplary flexible fuel sensor (400) that incorporates a float (405) that slides along a down member comprising a tube or a solid shaft (410). The float position is used to indicate the level of fuel in a fuel tank in which the sensor is installed. For example, the float position may be converted to an electrical voltage indicative of the fuel level, which may be displayed on a digital readout based on the voltage. Or, the float position may be used to control a current flowing through a bimetallic wiper on an analog fuel gauge, changing the wiper's state to indicate the fuel level in the tank based on the current. In these exemplary embodiments, a flexible down tube may comprise a coil of wire coil having a body length of between about 20.5 and 22 inches and an outside diameter less than or substantially equal to 0.5 inch, and may comprise stainless steel or carbon steel wire having a circular cross section with a wire diameter between about 0.065 and 0.085 inches. Alternatively, a flexible down shaft may comprise a solid shaft of flexible material such as plastic, for example, with a diameter less than 0.5 inch. Other types of tube or shaft may be also used, provided they are sufficiently flexible to be bent when inserted into the fuel tank, and sufficiently stiff to return to a free straight state when installed. In other exemplary embodiments, the down tube or shaft may comprise a plurality of alternating rigid and flexible portions, and/or one or more solid or hollow portions.

Figure 5:
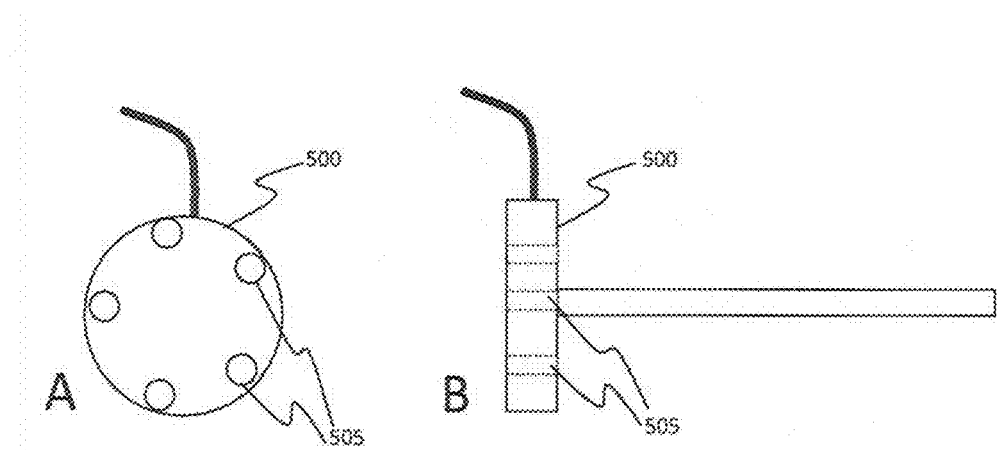
FIG. 5 presents diagrammatic views of a flange-mounted flexible fuel sensor.

FIG. 5 shows top (A) and side (B) views of a flange-mounted sensor. This sensor differs from those illustrated in FIGS. 3 and 4 in the manner of attachment of the mounting head 500 to the fuel tank. In this case, the fuel tank must be equipped with mounting flange with threaded holes, and the sensor is mounted to it with threaded bolts that pass through holes (505) in the mounting head. Sensors of this type typically use a 5 hole pattern. Other mounting arrangements may also be used.

Figure 6:
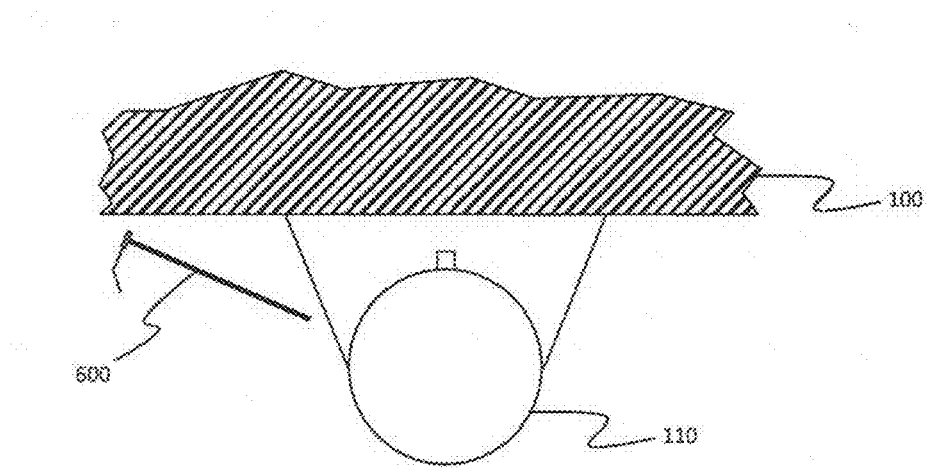
FIG. 6 is a diagram of a fuel tank attached to the bottom of a trailer, illustrating insufficient clearance to install a fuel sensor with a rigid down tube.
Figure 7:
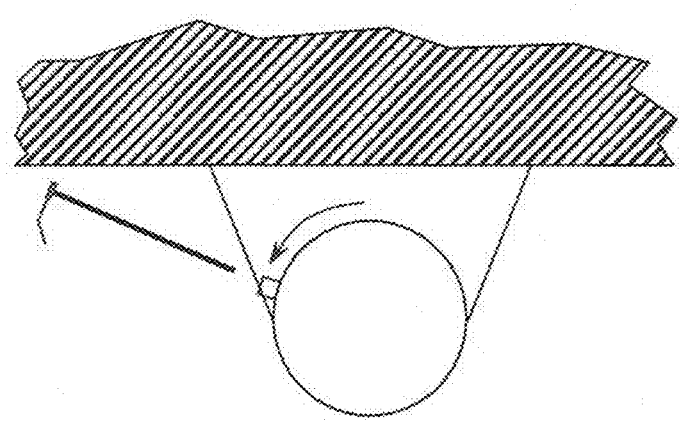
FIG. 7 is a diagram of the fuel tank of FIG. 6, rotated to enable the fuel sensor with rigid down tube to be installed.

FIGS. 6 and 7 illustrate the problem encountered using prior art fuel sensors. As noted previously, installing a prior art fuel sensor (600) comprising a rigid tube requires that the clearance between the trailer (100) and the fuel tank (110) be at least as great as the length of the fuel sensor. Since the clearance is not present when the tank is attached to the trailer, the prior art practice is to drain the tank, and rotate it so that sufficient clearance may be obtained to install the sensor, as shown in FIG. 7. After the sensor is installed, the tank must then be rotated back to its upright orientation and refilled with fuel. This can be a time consuming and expensive maneuver.

Figure 8:
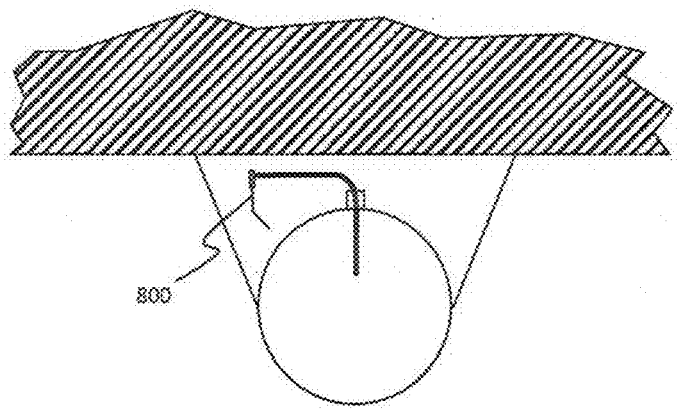
FIGS. 8 and 9 are diagrams of the fuel tank of FIG. 6, illustrating the installation of an embodiment of a flexible fuel sensor in accordance with the herein disclosed apparatus.
Figure 9:
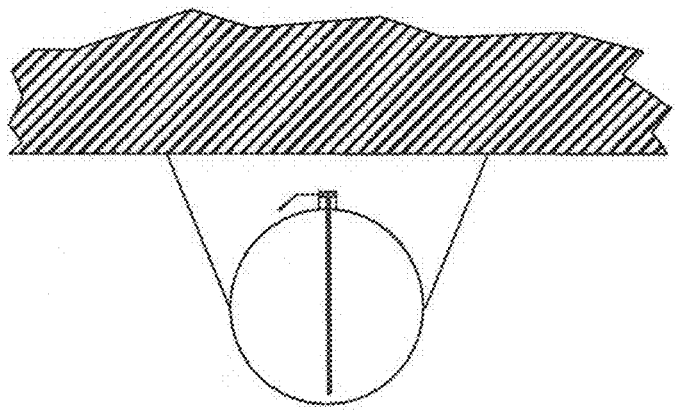

In contrast, as illustrated in FIG. 8, the herein disclosed flexible fuel sensor (800) does not require that the tank be drained or rotated. Instead, the flexible fuel sensor (800) may be installed on a fuel tank quickly and easily while the tank is attached to the trailer in an upright orientation and even containing fuel. In a currently preferred embodiment, the down tube comprises tightly wound wire in the form of one or more extension springs, although other implementations are possible. The resting condition of the springs, i.e., when no force is applied, is straight. When force is applied, such as during installation in a fuel tank (FIG. 8), the down tube bends under the applied force. In a currently preferred embodiment, the down tube can be bent as needed anywhere along its entire length, although rigidly straight portions shorter than the clearance between the tank and the trailer may also be included. When the force is removed, such as after the down tube is inserted into the tank (FIG. 9), the down tube returns to its free straight condition.

Figure 10:
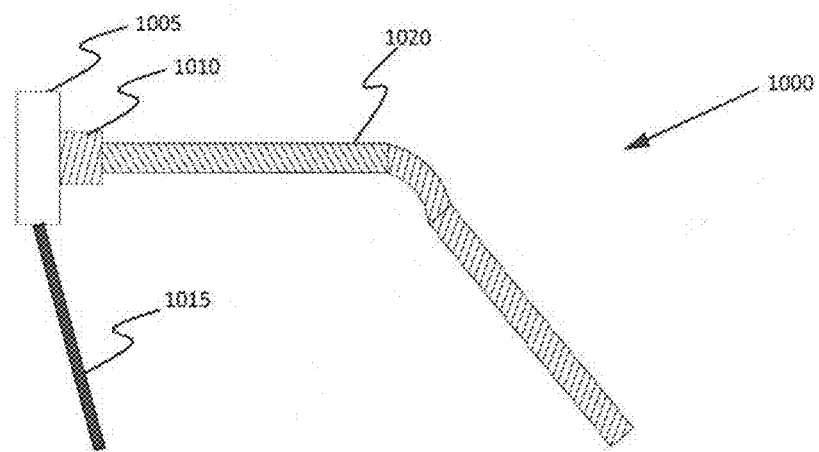
FIG. 10 is a diagram of an embodiment of a flexible fuel sensor in accordance with the herein disclosed apparatus.

FIG. 10 is a diagram of another exemplary flexible fuel sensor (1000). The sensor comprises a sensor head (1005), a threaded section (1010) and cable (1015) similar to those used in the prior art. However, the flexible fuel sensor comprises a flexible down tube (1020), shown in a flexed condition. One implementation uses a 0.5" diameter extension spring that is straight in its free condition, and can also be bent by applying force to bend the spring. The spring returns to its free straight condition when the force is removed.

During use, such as when the truck with reefer unit is being driven, fuel may slosh inside the tank, which may cause the sensor to flex as the fuel moves back and forth. This may cause deviations in the sensed fuel level. However, even when sloshing the average level of the fuel at any point in the tank can be expected to equal the level of the fuel when the truck is at rest and the fuel is not sloshing. Similarly, the average position of any part of a down tube that is bending due to fuel sloshing in the tank can be expected to equal the position of the down tube at rest. Accordingly, averaging may be employed to remove artifacts due to sloshing fuel and/or oscillating down tube.

Figure 11:
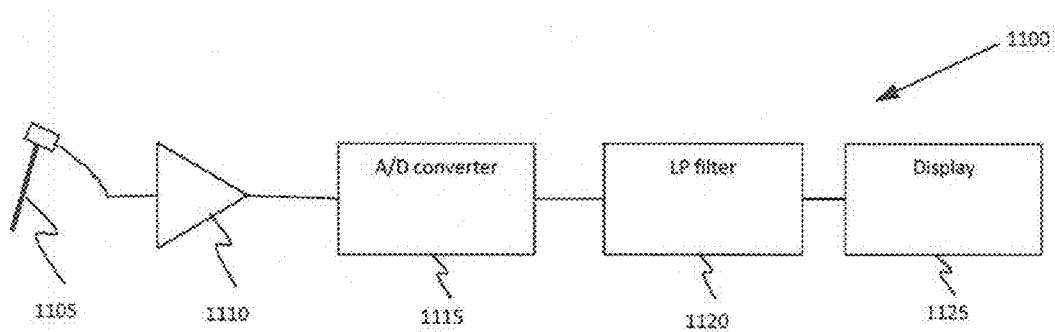
FIG. 11 is a schematic of digital apparatus that averages variations in the indicated fuel level due to fuel sloshing and/or oscillating down tube.

For example, FIG. 11 illustrates apparatus (1100) that averages variations in the indicated fuel level due to fuel sloshing and/or oscillating down tube. As shown, sensor (1105) is coupled to a buffer amplifier (1110), which is coupled to analog-to-digital (A/D) converter (1115). The A/D converter is coupled to a digital low pass (LP) filter (1120) which passes signals that have a time period that is long compared to the time periods that would be produced by either sloshing of fuel in the tank, or any oscillation of the flexible down tube of the fuel sensor. The signal from the low pass filter thus corrects for both effects. The corrected data signal is then passed to a digital display or remote reading device (1125).

Figure 12:
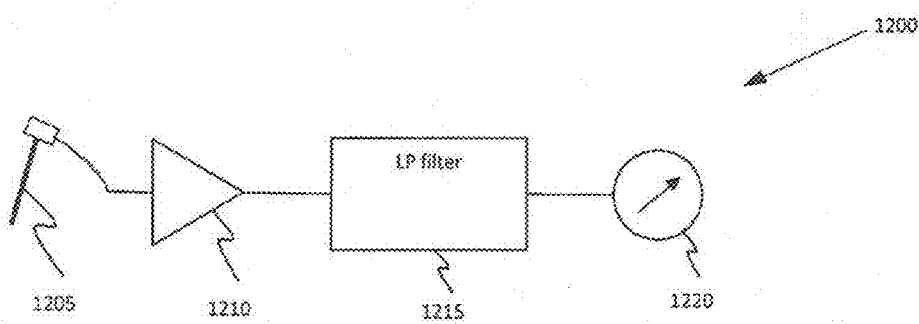
FIG. 12 is a schematic of analog apparatus that averages variations in the indicated fuel level due to fuel sloshing and/or oscillating down tube.

FIG. 12 illustrates an alternative implementation (1200). As shown, the sensor (1205) is connected to a buffer amplifier (1210), which is coupled to an analog low pass (LP) filter (1215) whose time constant is large as compared to both the sloshing and the oscillation frequency. The resulting signal is passed to an analog fuel gauge (1220).

It should be clear to one skilled in the art that the invention may be embodied otherwise without departing from its spirit and scope. For example it may be applied wherever fuel sensors with sensing tubes must be installed in close quarters.

Various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A flexible fuel sensor comprising:
   a fitting arranged to be mounted to a mating fitting on a fuel tank associated with a hole in the fuel tank;
   a flexible down member that is bendable to 90° using a bending force and that returns to a default straight configuration when the bending force is removed, the flexible down member extending from the fitting in a first direction and including a fuel level sensing mechanism, the down member configured to be mounted to extend through the hole into the fuel tank; and
   a sensor head extending from the fitting in a second direction and including sensor electronics coupled to the fuel level sensing mechanism;
   wherein:
   the flexible down member comprises:
      an inner flexible tube that comprises a first coil of wire; and
      an outer flexible tube that comprises a second coil of wire; and
   the first and second coils of wire permit the bending to 90° and provide a force that returns the flexible down member to its default straight configuration.

2. The flexible fuel sensor of claim 1, wherein the fitting comprises threads that screw into mated threads in the fuel tank fitting.

3. The flexible fuel sensor of claim 1, wherein the fitting comprises a flange that is bolted to a mated flange of the fuel tank fitting.

4. A flexible fuel sensor comprising:
   a fitting arranged to be mounted to a mating fitting on a fuel tank associated with a hole in the fuel tank;
   a flexible down member that is bendable to 90° using a bending force and that returns to a default straight configuration when the bending force is removed, the flexible down member extending from the fitting in a first direction and including a fuel level sensing mechanism, the down member configured to be mounted to extend through the hole into the fuel tank; and
   a sensor head extending from the fitting in a second direction and including sensor electronics coupled to the fuel level sensing mechanism;
   wherein:
   the fuel level sensing mechanism includes the flexible down member comprising:
      an electrically conductive inner flexible tube;
      an electrically conductive outer flexible tube; and
      at least one electrically insulating spacer disposed between the inner tube and the outer tube arranged to maintain uniform concentric separation between the inner and outer tubes; and
   the flexible fuel sensor comprises a capacitance measuring device coupled to the inner and the outer tubes, arranged to measure the value of the capacitance between the inner and the outer tubes, the fuel level being inferable based on the measured value of the capacitance.

5. The flexible fuel sensor of claim 4, wherein the fuel level is inferred by at least a portion of the sensor electronics included in the sensor head.

6. The flexible fuel sensor of claim 1, wherein the outer flexible tube coil has a body length of between about 20.5 and 22 inches and an outside diameter substantially equal to 0.5 inch, and comprises stainless steel or carbon steel wire having a circular cross section with a wire diameter between about 0.065 and 0.085 of an inch.

7. The flexible fuel sensor of claim 1, wherein:
   the fuel level sensing mechanism further comprises a float that is lighter than, and floats upon, fuel in the tank, the float being arranged to slide along a surface of the flexible down member when the member is inserted into the tank; and
   the fuel level is indicated based on the position of the float on the flexible down member.

8. The flexible fuel sensor of claim 7, wherein:
   the flexible down member comprises the coil of wire coil having a body length of between about 20.5 and 22 inches and an outside diameter substantially equal to or less than 0.5 inch; and
   the coil of wire comprises stainless steel or carbon steel wire having a circular cross section with a wire diameter between about 0.065 and 0.085 of an inch.

9. The flexible fuel sensor of claim 7, wherein the flexible down member comprises the flexible plastic shaft having a body length of between about 20.5 and 22 inches and an outside diameter less than 0.5 inch.

10. The flexible fuel sensor of claim 1, wherein the sensor electronics in the sensor head include a signal sending unit coupled to wires for sending a signal indicating fuel level in the fuel tank to a fuel level gauge.

11. The flexible fuel sensor of claim 1, wherein the sensor electronics in the sensor head include a wireless transmitter for sending a signal indicating fuel level in the fuel tank to a fuel level gauge.

12. The flexible fuel sensor of claim 1, further comprising a battery providing power to the sensor electronics in the sensor head.

13. A flexible fuel sensor comprising:
   a sensor head, including:
      sensor electronics, including a signal sending unit;
      sensor wiring having first and second ends, the first end attached to the sensor electronics;
      a connector attached to the second end of the sensor wiring, connectable to a mated connector attached to fuel gauge wiring;
      a threaded fitting attached to the sensor head comprising threads that screw into mated threads in a hole in a fuel tank; and
   a flexible down member that is bendable to 90° using a bending force and that returns to a default straight configuration when the bending force is removed attached to the threaded fitting, including a fuel level sensing mechanism connected to the sensor electronics;
wherein:
   the flexible down member comprises:
      an inner flexible tube that comprises a first coil of wire; and
      an outer flexible tube that comprises a second coil of wire; and
      the first and second coils of wire permit the bending to 90° and provide a force that returns the flexible down member to its default straight configuration.

14. The flexible fuel sensor of claim 9, wherein the threaded fitting is incorporated into the sensor head.

15. The flexible fuel sensor of claim 9, further comprising a protective cover surrounding the sensor wiring.

\* \* \* \* \*